United States Patent                                    [11] 3,632,404

| [72] | Inventors | Charles W. Desaulniers |
|---|---|---|
| | | Franklin; |
| | | Cheryl A. Ford, Dedham, both of Mass. |
| [21] | Appl. No. | 751,718 |
| [22] | Filed | Aug. 12, 1968 |
| [45] | Patented | Jan. 4, 1972 |
| [73] | Assignee | Amicon Corporation |
| | | Lexington, Mass. |

[54] METHOD OF TREATING POLYSULFONE WITH ALCOHOL OR KETONE
4 Claims, No Drawings

| [52] | U.S. Cl. | 117/106, |
|---|---|---|
| | | 136/86, 264/83 |
| [51] | Int. Cl. | C23c 13/04 |
| [50] | Field of Search | 264/83, |
| | | 340; 117/106; 136/86 |

[56] References Cited
UNITED STATES PATENTS

| 2,510,262 | 6/1950 | Sallner et al. | 264/340 X |
|---|---|---|---|
| 3,170,892 | 2/1965 | Busse | 117/106 X |
| 3,189,479 | 6/1965 | Coppick et al. | 117/106 X |
| 3,192,300 | 6/1965 | Pehn | 264/340 |
| 3,300,553 | 1/1967 | Shelby | 264/340 X |
| 3,324,211 | 6/1967 | Maurer et al. | 264/340 X |
| 3,327,033 | 6/1967 | Koch et al. | 264/83 |

*Primary Examiner*—Allen B. Curtis
*Attorney*—R. W. Furlong

ABSTRACT: A process for making a rewettable microporous membrane, advantageously a rewettable and highly anisotropic membrane, comprising the step of filling the inner surfaces of the micropores with the vapor or gas of a volatile water-miscible compound having low surface tension and viscosity; the compound is then deposited on the micropore surface by a condensing step. Methanol and like compounds are particularly advantageous compounds for use in forming the rewettable membrane.

METHOD OF TREATING POLYSULFONE WITH ALCOHOL OR KETONE

BACKGROUND OF THE INVENTION

This invention relates to a novel process for rewetting microporous membranes for use as moisture vapor transmission elements in fuel cells and the like. The most advantageous membranes for use in this process are anisotropic membranes, e.g. anisotropic polysulfone membranes, the preparation of which will be described below. By rewetting is meant making the micropores of a predried membrane so receptive to aqueous liquid that they may be readily filled therewith despite their very small size.

In a fuel cell, e.g. a hydrogen-oxygen fuel cell of the alkaline variety, one of the major problems is the successful removal of product moisture which is formed according to the chemical equations:

$$H_2 + 2OH^- \rightarrow 2H_2O + 2e^- \text{(Anode Reaction)}$$
$$\tfrac{1}{2} O_2 + H_2O + 2e \rightarrow 2OH^- \text{(Cathode Reaction)}$$

Operation of other types of fuel cells also results in the formation of water vapor, to wit:

In the alkaline methanol fuel cell:

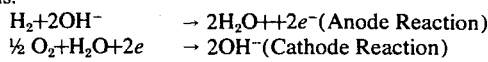

In the acidic methanol fuel cell:

This water must be removed from the fuel cell at the rate at which it is formed; but this removal must be accomplished without the escape of any of the other gases or liquids which are reactants in, and products of, the fuel cell reaction. Clearly the properties required for a membrane which will allow such selective passage of water are very stringent; they have not heretofore been achieved by any light simple membrane. On the contrary, use of massive composite structures have been required.

A successful water-vapor transmission membrane for fuel cell must possess:
1. Very high water vapor transport rate.
2. Very low or zero hydraulic permeability.
3. Very low or zero permeability to gases such as hydrogen, oxygen, nitrogen and the like.
4. Chemical stability in an environment of an extraordinarily corrosive nature.
5. Adequate mechanical strength.
6. Thermal stability to 95° C., most advantageously to 150° C.

No really acceptable membrane for these purposes has been known in the prior art. However, one such membrane is described in the commonly owned and copending U.S. Pat. application, Ser. No. 742,516 filed July 5, 1968 by Charles W. Desaulniers, Cheryl A. Ford and Richard W. Mayo and entitled "Process for Making a Membrane."

In order to function advantageously as a moisture-vapor transmitting, hydrogen-retentive membrane in a fuel cell, a membrane must have its micropores filled with liquid. It has been discovered that, when an anisotropic membrane of the type described herein is utilized, a totally wetted membrane will have only a very small hydrogen flux of about 0.002 liters per minute per square foot of membrane surface at 50 pounds per square inch hydrogen pressure. Were the same membrane dry, it would permit the transport therethrough of 150 liters per ft.² per minute of hydrogen under the same operating conditions. Thus, it is important that a membrane be highly wettable; it is also important that a membrane be rewettable after any drying so that it need not be kept in a wetted condition during storage or during its installation in a fuel cell. The latter circumstance is particularly important because the membrane is often necessarily dried before it can be suitably bonded into a fuel cell assembly.

A dried membrane subjected to such ordinary rewetting procedures as soaking in water for 5 days, or immersion in boiling water, or soaking in hot concentrated alkali fails to achieve this very low value of 0.002 liters hydrogen per minute per square foot of membrane surface at 50 pounds per square inch. The lowest hydrogen flux achievable with such an ordinary rewetting procedure is 0.05 liters of hydrogen per ft.² per minute at 50 p.s.i. differential operating pressure, a value too high to tolerate.

The excess hydrogen transfer in the ordinary wetting procedure is due to some very small pores remaining unfilled with water and thus capable of transmitting hydrogen gas. The wetting procedure herein described accomplishes the filling of even the smallest pores.

SUMMARY OF THE INVENTION

Therefore, it is an object of the invention to modify the surface of microporous membranes to render the microporous membranes readily water rewettable.

This object has been substantially achieved by subjecting a dry microporous membrane to a rewetting step comprising filling the micropores with the gas or vapor of a water-miscible compound of low surface tension (i.e. low viscosity), and condensing this material onto the internal surface of the micropores. The liquid in the micropores may then be replaced easily by water.

Among the water-miscible materials which can be utilized are the lower alkyl alcohols like methanol, ethanol, isopropanol, lower molecular weight ketones such as methyl ethyl ketone and the like. However, it must be remembered that the solvent should not attack the porous membrane structure (always a concern when polymeric membranes are used) at the treating temperatures.

Methanol with a boiling point of 64.7° C., an infinite solubility in water and a very low surface tension of only 16 to 20 dynes per centimeter (in contact with air) in the temperature range of 0° to 65° C., is an excellent choice for most work. Those skilled in the art should have little difficulty in selecting a compound that will fit their purpose. The important aspects of the invention are that:

1. the compound be volatilized so that it can be readily absorbed into the membrane pores
2. that once in the pores the material be condensed to a liquid form and
3. that the surface tension of the material be low enough so that, on condensation, it thoroughly coats the internal walls of the micropores.

Preferred liquids are those which are chemically inert with respect to the polymer from which the membrane is formed and have vapor pressures of above 600 mm. of mercury and surface tensions of less than 25 dynes per centimeter (air contact). Practical operating conditions usually require such a liquid to have these properties under 100° C.

A particularly useful membrane for use with this process is a highly anisotropic polysulfone membrane. By "anisotropic" is meant that class of membrane which has a very thin barrier skin and a thicker, more open support layer integral therewith. Typically, the barrier skin is between about 0.1 and 5 microns; the micropores forming channels through the barrier skin have effective average pore sizes (i.e. diameters) of from 20A to 100A, but are not restricted to these dimensions. The thickness of the support layer is much greater than that of the barrier skin and normally brings the total membrane thickness to about 0.003 inch or greater. However, the pore size of the support layer is so much larger than the micropores in the barrier layer that no significant additional resistance to fluid, gas or vapor transfer is encountered within the support layer. The void volume in the support layer is normally 50–80 percent of the total volume of the support layer, whereas the void volume of the skin layer is seldom over about 2–3 percent, and is usually less than about 2 percent. Such membranes are by far the most preferable for use in the process of the invention because the extremely thin barrier layers make them most susceptible to rewetting.

Polysulfones are polymers having excellent resistance to thermal and oxidative degradation. The distinctive feature of such polymers is the presence of the sulfone group as a linkage in the polymer chain. Among preferred polysulfone polymers, i.e. those having the advantageous properties making them most suitable for use in the invention, a preferred commercially available polysulfone includes repeating units comprising a polysulfone linkage in a diphenylene sulfone group:

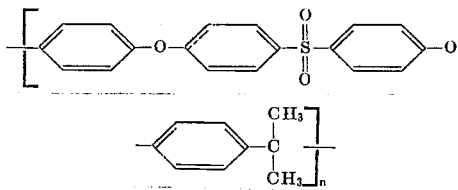

In this configuration, the sulfone linkage apparently tends to draw electrons from the adjacent benzene rings making them electron deficient and therefore relatively nonsusceptible to oxidative attack. The resonant nature of aromatic rings makes the diphenylene sulfone group capable of dissipating heat and radiation energy without chain scission or cross-linking taking place.

Moreover, the excellent thermal properties of polysulfone permit it to maintain its utility over a temperature range extending from −150° to 300° F. or more. Some polysulfones are recommended for long term use at temperatures as high as 340° C. in air, e.g. the materials sold under the trade designation P-1700 and P-2300 by Union Carbide Corporation. Furthermore, the mechanical properties of the polysulfones are excellent: the flexural modulus stays above about 300,000 pounds per square inch even at temperatures of 300° F. and above.

A suitable anisotropic membrane meeting the stringent requirements of a moisture vapor transmission membrane can be formed as follows:

Twenty grams of polysulfone pellets of the type available under the trade designation P-1700 from Union Carbide Corporation are dissolved in 80 grams of N,N'dimethylformamide at 25°–30° C.

The solution thus formed is cast upon a glass plate in a 0.011 inch thick film formed with a drawdown bar or other casting knife as known in the art. The edges of the glass plate are covered with tape and the casting solution extends to the tape. This procedure allows the underside of the membrane to be protected from seepage of liquid thereunder during a subsequent precipitation step. The film is then dipped into a gently circulating bath of water at about 25° C. for about 10 minutes.

During submersion in the bath, a membrane is formed by a precipitative process, which membrane has a thickness of about 5 mils and comprises a spongy substructure of a void volume approximately 70–75 percent as calculated by the following formula:

Void volume percent = 100
$$-\left[\frac{\text{Apparent density of membrane}}{\text{Density of polymer}} \times 100\right]$$

The membrane also comprises a very thin barrier skin of relatively dense configuration. The thickness of this skin is from about 1 to 4 microns (0.00005 inches to 0.0002 inches). And its void volume is preferably at least about 1 percent and usually not more than about 2 percent.

The membrane, still on its glass substrate, is removed to a second bath and leached for an additional period of time until the solvent is completely removed. This step has been found to be highly advantageous when the membrane is to be dried before subsequent use in a fuel cell.

The process of the invention can be carried out at any temperature and pressure which are acceptable to the processor. However, a chief advantage of the process is that it can be carried out at very moderate operating conditions and does not require extremes of temperature and pressure.

The dried membrane may be stored, subjected to fabrication or bonding procedures during installation in a fuel cell, or other manipulative procedures. It must be totally rewet, however, to fulfill its function of a gastight water-vapor-transmissive barrier.

ILLUSTRATIVE EXAMPLE OF THE INVENTION

A polysulfone membrane, the preparation of which is described above, is completely dried in an air-circulation oven at 105° C. for 1 hour. This membrane is removed from the oven and allowed to cool to room temperature. When rewet with water over a period of 5 days, or with boiling water for 2 hours, the membrane allowed a flux of more than 0.05 liters per square foot per minute of hydrogen to pass through the membrane at a temperature of 25° C. and a 50 p.s.i. hydrogen operating pressure. This compares to a desired hydrogen flux of below 0.003 liters, preferably 0.002 liters, per square foot per minute under these operating conditions when the membrane is properly rewetted.

Another sample of the same membrane was immersed in methyl alcohol at a temperature of about 60° C. for one-half hour, thereby condensing methyl alcohol in the micropores of the membrane. At 60° C., the methanol has a vapor pressure of 625 mm., a viscosity of only about 0.35 centipoise, and a surface tension of less than 20 dynes/cm.[2]. Upon removal from the methanol bath, the membrane is first immersed in a 50—50 methanol-water mixture at 25° C. for about 40 minutes and then into a water bath at 25° C. for about 30 minutes.

The resulting water-soaked membrane had a hydrogen flux (under the above-indicated operating conditions) of only about 0.003 liters per square foot per minute. The nitrogen flux, tested at 50 pounds per square inch nitrogen pressure was only 0.00015 liters per square foot per minute. This latter result further demonstrates the extraordinary gas-discriminating properties of the membrane. This membrane performed very satisfactorily in fuel cell applications of the type described earlier in this specification.

We claim:

1. A process for rendering rewettable by water a microporous membrane composed of polysulfone comprising the steps of
   1. filling the pores of said membrane with the vapor of a member of the class consisting of lower alkyl alcohols and methyl ethyl ketone, and
   2. condensing said member within said pores.

2. A process as defined in claim 1 wherein said member is methyl alcohol.

3. A process as defined in claim 2 including the additional step of immersing the membrane in water.

4. A process as defined in claim 1 including the additional step of immersing the membrane in water.

* * * * *